United States Patent [19]

Fender

[11] Patent Number: 4,644,897
[45] Date of Patent: Feb. 24, 1987

[54] MODULAR ROBOTIC FINISHING WORK CENTER

[75] Inventor: Norman N. Fender, Monroe, Mich.

[73] Assignee: Graco Robotics, Inc., Livonia, Mich.

[21] Appl. No.: 782,430

[22] Filed: Oct. 1, 1985

[51] Int. Cl.⁴ .............................................. B05B 15/12
[52] U.S. Cl. .................................... 118/323; 118/326; 118/DIG. 7; 901/43; 98/115.2
[58] Field of Search ........... 901/43; 118/326, DIG. 7, 118/323

[56] References Cited

U.S. PATENT DOCUMENTS

| | | | |
|---|---|---|---|
| 3,932,151 | 1/1976 | Lau | 118/326 |
| 4,187,454 | 2/1980 | Ito | 901/43 X |
| 4,348,731 | 9/1982 | Kogawa | 901/43 X |
| 4,378,959 | 4/1983 | Susnjara | 901/43 X |
| 4,531,885 | 7/1985 | Molaug | 901/21 X |
| 4,532,148 | 7/1985 | Vecellio | 118/326 X |

FOREIGN PATENT DOCUMENTS

| | | | |
|---|---|---|---|
| 2942184 | 4/1981 | Fed. Rep. of Germany | 118/326 |
| 691211 | 10/1979 | U.S.S.R. | 118/326 |

Primary Examiner—Shrive P. Beck
Attorney, Agent, or Firm—Paul L. Sjoquist

[57] ABSTRACT

A self-contained work center for automatic spray finishing of parts, having an elevated platform with a turntable mounted thereon which is rotatable about a vertical axis, a robot manipulator fixedly mounted relative to the vertical axis, wherein the turntable ends are rotatable through a circular path, at least part of which includes a partially protected booth for collecting paint residue and overspray. The robot manipulator has a movable arm and spray applicator capable of movement over a limited range so as to provide a predetermined envelope of possible work areas for spray finishing, and a portion of the turntable end path and at least a portion of the spray booth are included with this envelope. The apparatus includes an access position to the turntable for mounting and removing parts associated with the spray finishing operation. A service enclosure is located beneath the elevated platform for housing electrical and hydraulic components for cooperatively operating the robot manipulator and turntable.

16 Claims, 7 Drawing Figures

MODULAR ROBOTIC FINISHING WORK CENTER

BACKGROUND OF THE INVENTION

The present invention relates to spray finishing systems, and more particularly to a self-contained work center for the automatic spray finishing of component parts which are mounted to a rotatable turntable, and wherein finishing is accomplished by a robot manipulator affixed proximate the center of the turntable rotation.

In the prior art it is well-known to provide a finishing work station wherein a paint spray booth or like structure is fixedly mounted adjacent a moving conveyor, and wherein workpieces are attached to the moving conveyor to progress past the spray booth. In such construction it is common to provide a finishing applicator fixedly or movedly positioned opposite the spray booth and conveyor, so that workpieces are moved intermediate the finishing applicator and spray booth for coating. The spray booth functions to collect paint overspray and residue which does not attach to the workpiece, and to remove this excess material from the vicinity of the finishing station. Conventional spray booths have used an air exhaust system for collecting and conveying excess spraying material away from the finishing station, and have also used recirculating water systems wherein excess spray materials are collected in the water and pumped through a filter medium for removal. It is known to provide spray finishing applicators which are fixedly positioned relative to the conveyor, and also which are mounted to a reciprocating machine which provides vertical reciprocating motion to the applicator at the same time as the workpiece is horizontally conveyed past the applicator.

Another form of finishing application system which is known in the art comprises a paint applicator in the form of a spinning disc or bell, which applicator is centrally positioned about a conveyor which moves over a circular arc. In this type of spraying system paint is applied to the spinning disc and is continually hurled outwardly about a circular path, and workpieces are conveyed along the circular arcuate path to receive the paint as it is released from the spinning disc or bell. Such finishing systems typically include some form of enclosure or booth for shielding the environment from paint overspray and collecting excess paint residue which is produced by the system.

SUMMARY OF THE INVENTION

The invention comprises a self-contained finishing work center having an elevated platform for conducting the spray finishing operation, and an equipment enclosure beneath the platform for accommodating electrical and hydraulic equipment necessary to the operation of the work center. The elevated platform includes a rotatable turntable mounted to a spindle, and a robot manipulator fixedly attached relative to the spindle, the robot manipulator having a computer controlled manipulator arm which has the capability of limited three dimensional positioning of a finishing applicator, and wherein the rotatable position of the turntable is also controllable by the same computer. The turntable is driven through a ring gear which is coupled to two oppositely driven hydraulic motors through a servo valve, and turntable position is measured by a resolver coupled to the same ring gear. A spray booth may be positioned adjacent to the turntable, and an access position to the turntable is preferably provided diametrically opposite the spray booth position. The access position is used for loading and unloading parts relative to the turntable, for the spray finishing operation.

BRIEF DESCRIPTION OF THE DRAWINGS

The invention will become apparent from the following specification and claims, and with reference to the drawings, in which;

DESCRIPTION OF THE PREFERRED EMBODIMENT

Figure 1:
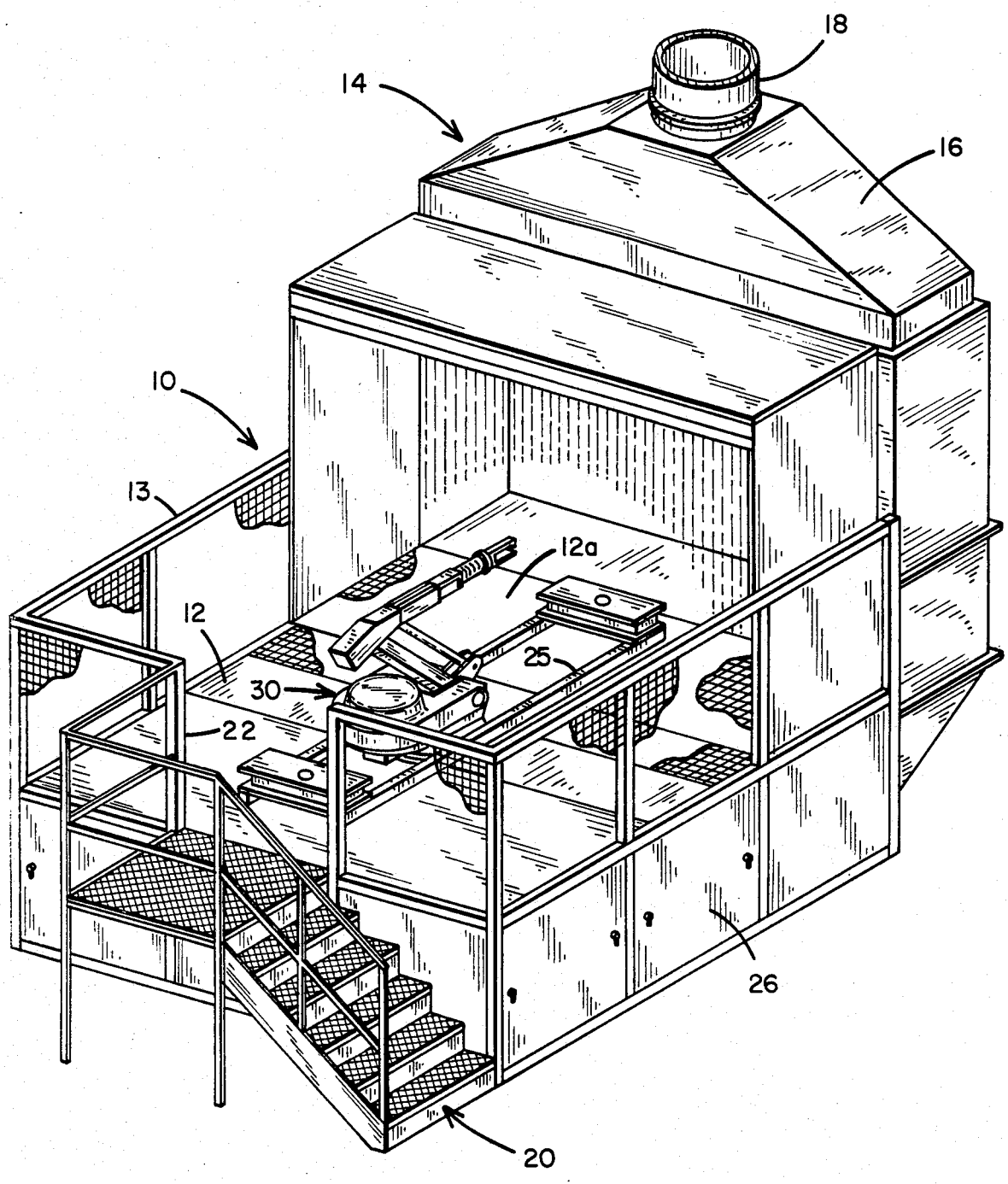
FIG. 1 shows an isometric view of one form of the apparatus.
Figure 3:
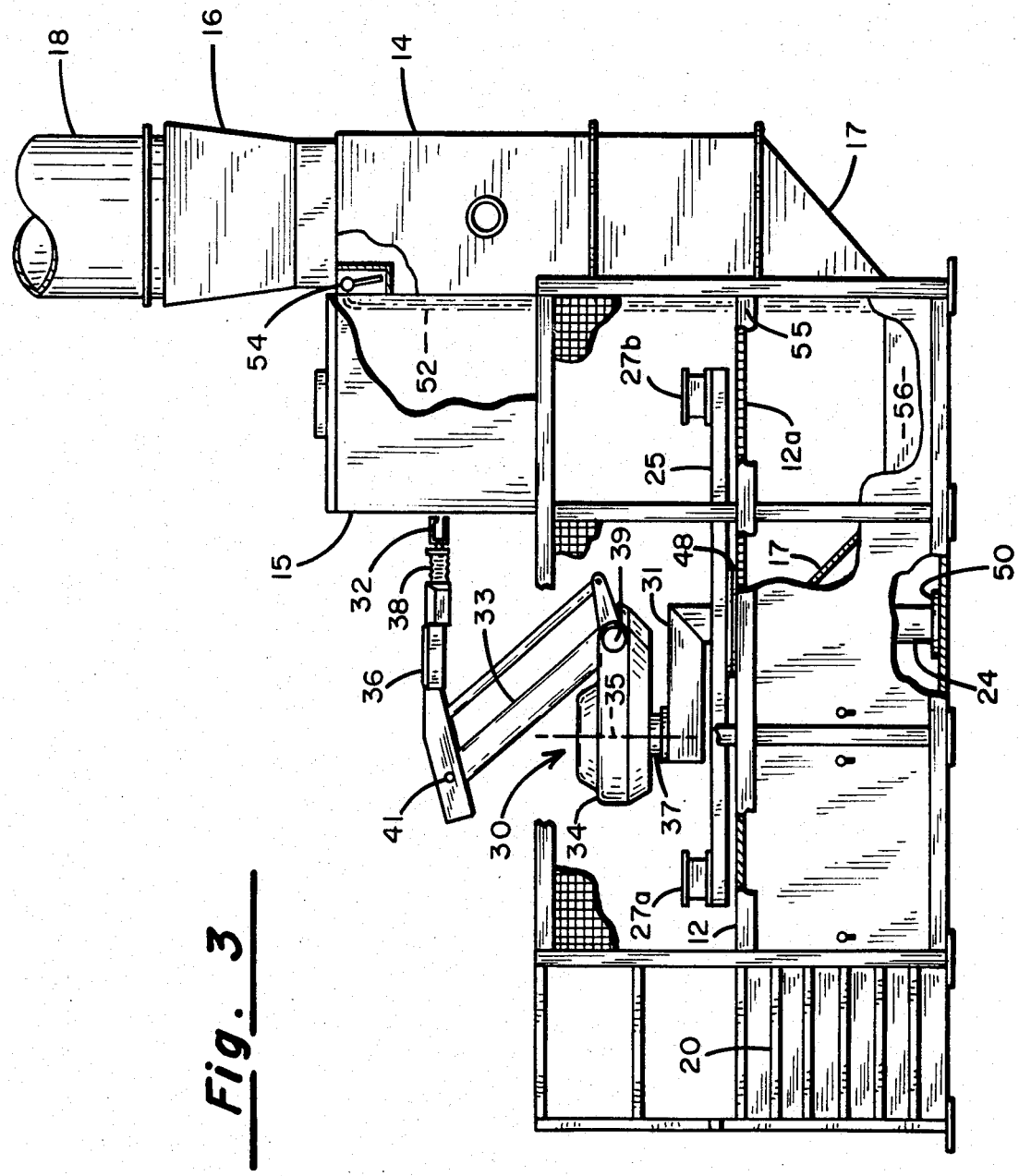
FIG. 3 shows a side elevation view in partial cross section.

Referring first to FIG. 1, the invention is shown in an isometric view. A work center 10 is adapted for positioning on the floor of an industrial plant or other facility, and it is presumed electrical power and water is supplied work center 10 from external sources. Work center 10 includes an elevated platform 12 which is surrounded by a suitable fence 13, and is positioned adjacent to an enclosure 14 having an opening facing platform 12. Enclosure 14 has a hood 16 and exhaust duct 18 mounted to an opening in hood 16. A stairway 20 provides access to platform 12, and an opening 22 through fence 13 provides an access position to entry on platform 12. A rotatable turntable 25 is fixed above platform 12 and is rotatably positionable about spindle 24 (FIG. 3). A robot manipulator 30 is fixedly positioned relative to spindle 24, and clearance is provided beneath robot manipulator 30 to enable the free rotation of turntable 25 intermediate robot manipulator 30 and platform 12. Access space 26 is provided beneath platform 12 for the housing of electrical and mechanical equipment as hereinafter described. A portion 12a of platform 12 may be formed of an open grillwork or mesh, immediately adjacent to the opening in enclosure 14.

Work center 10 may be made of any convenient dimensions, and in the preferred embodiment it has been determined that a platform of square dimensions of twelve feet on each side is adequate for the intended purpose. Enclosure 14 may extend a distance of approximately eight feet above platform 12, and platform 12 may be positioned approximately four feet above the floor level.

Figure 2:
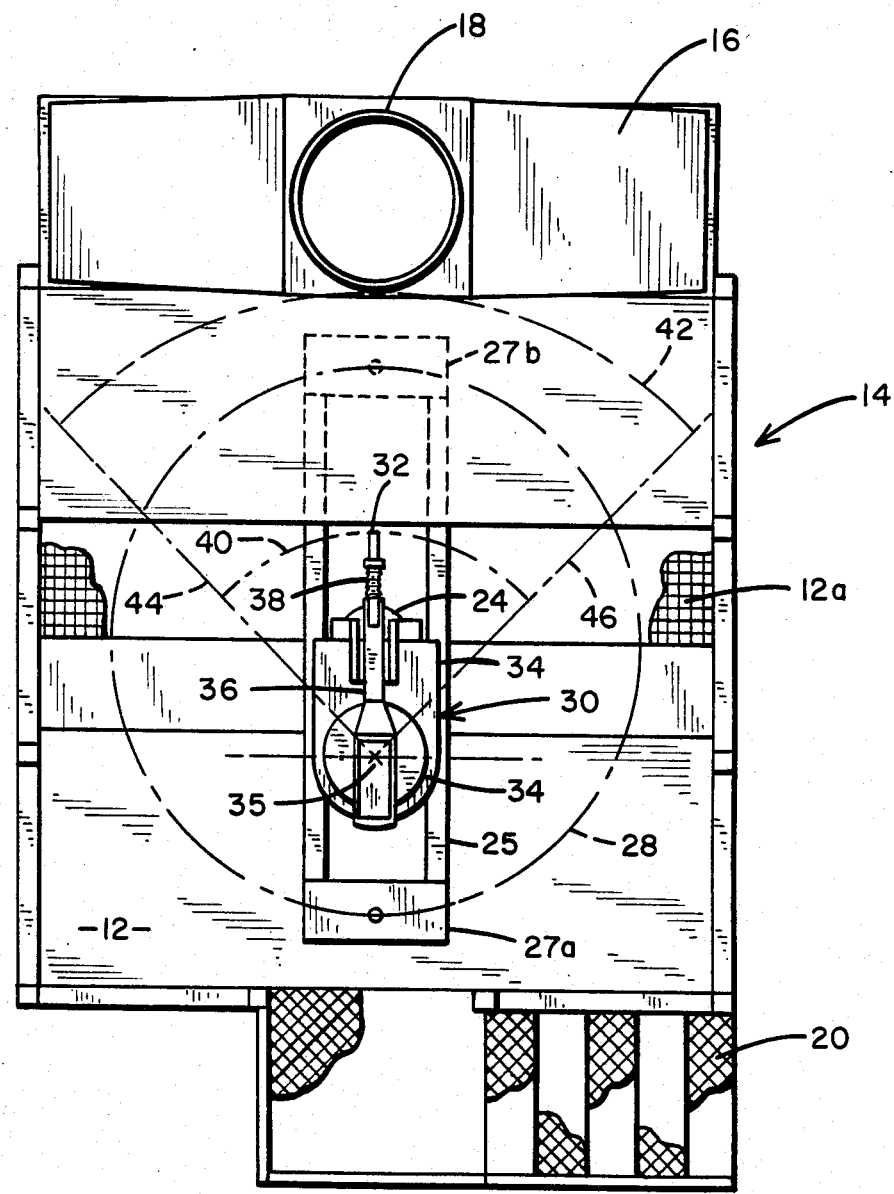
FIG. 2 shows a top view of the apparatus of FIG. 1.

FIG. 2 shows a top view of one form of the invention, and illustrates the cooperative relationship between the respective moving components on platform 12. Turntable 25 is rotatably positionable to turn about a circular arc 28, and contains two or more parts mounting stations. Turntable 25 may be formed into any number of parts mounting configurations, although a preferred construction showing two parts mounting stations 27a and 27b is shown in FIG. 2. It is apparent that an alternative construction having four parts mounting stations could readily be formed by adding two additional legs extending from spindle 24 at right angles to the construction shown on FIG. 2. Parts mounting stations 27a and 27b travel along a circular arc 28 as turntable 25 is rotated about spindle 24. Station 27a is shown in a loading and unloading position, and station 27b is shown in a finishing position wherein a spray finishing operation may be performed.

The robot manipulator 30 is fixedly attached to a cantilevered arm 31 (FIG. 3) extending from the center of spindle 24. A rotatable body 34 is mounted on cantilever arm 31, and is pivotal about a vertical axis 35 extending normal to arm 31. Arms 33 and 36 are connected to rotatable body 34, and a flexible wrist mechanism 38 is connected to the forward end of arm 36. Spray applicator 32 is attached at the forward end of flexible wrist 38, and is manipulable by the computer controls which actuate robot manipulator 30 to perform a spray finishing operation.

A type of robot manipulator 30 which is well-suited for use in the present invention is disclosed in U.S. Pat. No. 4,531,885, issued July 30, 1985, which disclosure is incorporated by a reference herein. The servomechanisms which control the movement of the various members of this robot manipulator are adapted for connection to a digital computer processor, and the movements of the members can be programmed into the processor for subsequent control of movement by the processor. In a similar manner servomechanisms can be connected to turntable 25 and to the processor which controls robot manipulator 30 so that rotational movement and position of turntable 25 can be programmed into the processor and can be subsequently initiated under processor control. The servomechanisms and digital computer communications techniques necessary for the processor control of turntable 25 are readily determinable by those having skill in this art.

The spray head of spray applicator 32 is positionable under computer control to any point within an envelope defined by arcuate lines 40 and 42 and radial lines 44 and 46, which radial lines emanate from vertical axis 35. Spray finishing operations are possible at any position inside of the envelope so defined, and it can be seen that the circular arc 28 which defines the rotatable position of parts mounting stations 27a and 27b is within this envelope over approximately ninety degrees of its arcuate distance. Thus, turntable 25 and spray applicator 32 can be cooperatively positioned relative to each other to accomplish spray painting of parts or other objects placed on turntable 25 to permit a wide range of spraying positions.

FIG. 3 shows a side elevation view of work center 10 in partial cross section. Turntable 25 is rotatably mounted to platform 12 by means of plate bearing assembly 48. Plate bearing assembly 48 is constructed so as to provide free rotational movement between an upper and lower bearing member, the upper bearing member being attached to turntable 25 and the lower bearing member being attached to platform 12. An opening through the center of plate bearing assembly 48 permits the passage of spindle 24, which projects upwardly above turntable 25 and is fixedly attached to platform 12 and to the base of work center 10 by means of a mounting plate 50. Spindle 24 has rigidly affixed thereto a cantilever arm 31 which projects toward the rear of work center 10. Rotatable body 34 is pivotally attached to arm 31 at vertical axis 35. This attachment is made by means of a mounting plate 37 rigidly attached to arm 31 and rotatably attached to body 34.

Robot manipulator 30 has a generally upwardly extending arm 33 which is pivotable about a horizontal axis 39 at its lower end, contained in rotatable body 34. A second horizontal axis 41 at the upper end of arm 33 is coupled to arm 36 and permits pivotal motion of arm 36 about axis 41. Flexible wrist 38 is movable in three directions on the end of arm 36, the three directions being defined as roll, pitch and yaw. Spray applicator 32 is fixedly attached at the end of flexible wrist 38, and is therefore movable over a wide range of positions. Altogether, robot manipulator 30 has freedom of movement over six axes of motion.

A spray booth and air exhaust system is constructed about enclosure 14. Enclosure 14 is preferably constructed of sheet metal, and has an opening 15 facing robot manipulator 30. Enclosure 14 extends downwardly below platform 12 to form an air duct 17 which opens into a grating 12a which forms a portion of platform 12. Exhaust duct 18 is connected to a blower or source of suction (not shown) to cause air to be drawn upwardly through grating 12a, and to be directed by air duct 17 into the rear portion of enclosure 14, and thereafter upwardly through hood 16 and exhaust duct 18. This air flow is used to convey paint overspray and residue away from the area of the spray painting station 27b. Additionally, a water flood sheet 52 may be provided for collecting additional overspray immediately behind spray station 27b. Water flood sheet 52 is supplied with a continuous curtain of water from a water reservoir 54, which flows downwardly through an opening 55 in platform 12 into a water collection tank 56. The collected water in tank 56 is filtered and recirculated back to reservoir 54 according to principles which are well known in the art. Water flood sheet 52 preferably extends over the entire width of enclosure 14, and water tank 56 is preferably constructed to receive drainage over this entire width. Air duct 17 is constructed so as to provide openings for the return flow of water from water flood sheet 52 into tank 56, and exhaust air is directed to flow through the curtain of water which falls downwardly through opening 55.

Figure 4:
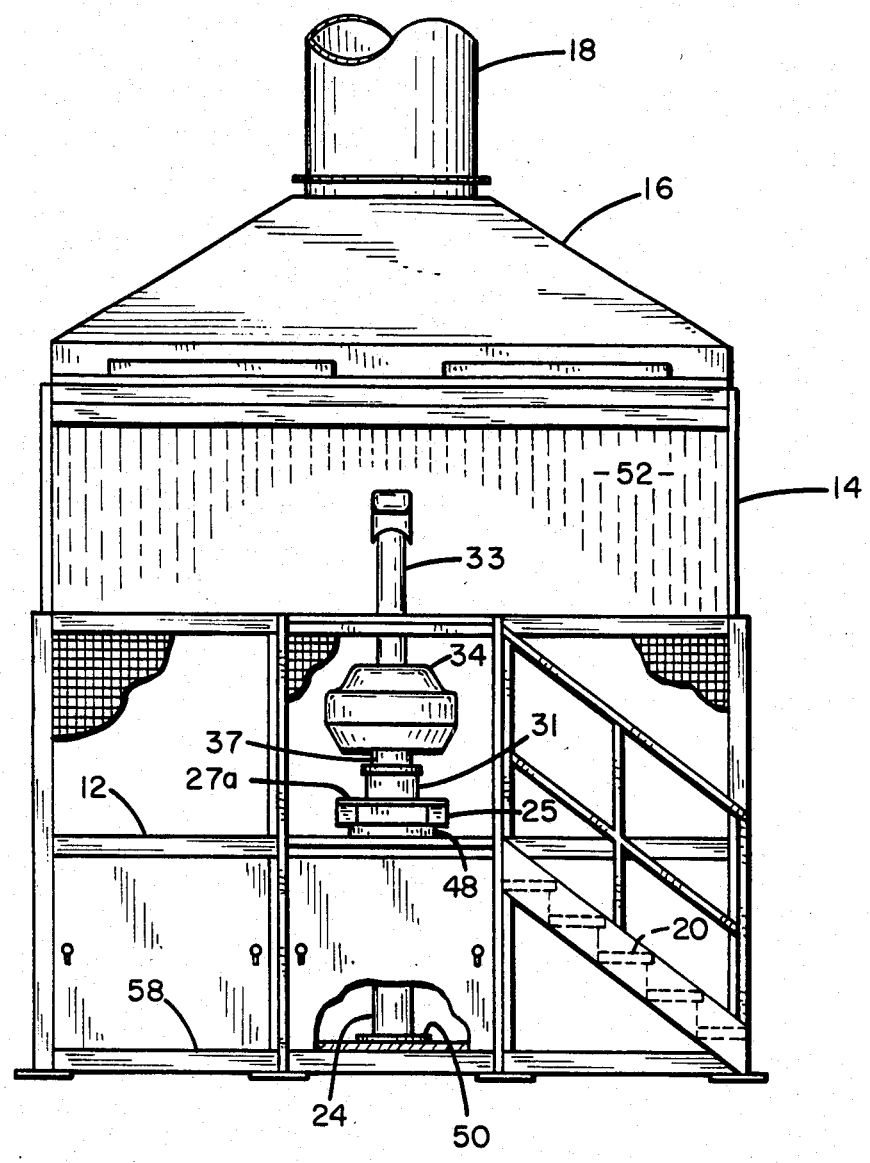
FIG. 4 shows an end elevation view of the apparatus of FIG. 1.

FIG. 4 shows an end elevation view of work station 10. Enclosure 14 extends across the entire width of work station 10, and water flood sheet 52 similarly extends over the entire width of enclosure 14. Robot manipulator 30 is centrally positioned on platform 12 to provide equal areas of spray application on either side of spindle axis 24. Platform 12 is preferably positioned at a height of approximately four feet above base frame 58, thereby to provide a sizable volume of access space 26, for the mounting of operational equipment associated with work center 10. For example, spray applicator 32 frequently requires a source of compressed air, and the air compressor and the pneumatic equipment required for providing this air may conveniently be positioned beneath platform 12 in access space 26. Similarly, the apparatus requires a source of electrical power and a source of pressurized hydraulic fluid for driving the various servomechanisms associated with the apparatus. This equipment may also be positioned beneath platform 12, and all necessary lines and cables required for delivery of power to the robot manipulator 30 and turntable 25 may be fed through spindle 24. In particular, the hoses and electrical connections required by robot manipulator 30 are passed through a central hollow opening through spindle 24.

Figure 5:
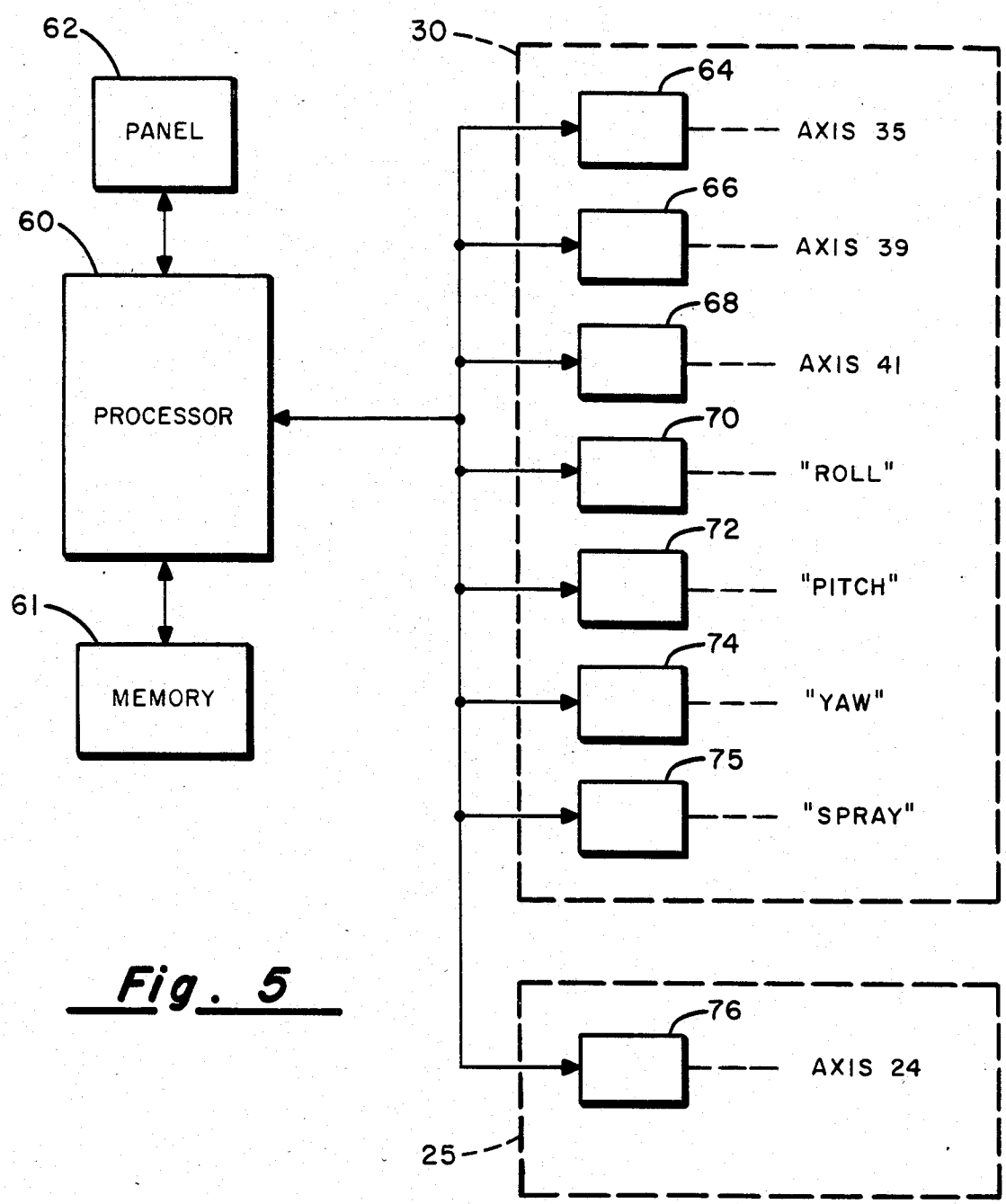
FIG. 5 shows a symbolic diagram of certain of the electrical and mechanical components of the invention.

FIG. 5 shows a symbolic diagram of certain electrical and mechanical components of the invention. These components are placed in physical proximity to the respective members of robot manipulator 30 and turntable 25, and certain of the components are placed in access space 26 beneath platform 12. Where required, certain electrical, hydraulic, air and coating material lines may be fed from beneath platform 12 through the opening in spindle 24 to connect to the appropriate control or drive mechanism. Digital processor 60 may conveniently be placed in access space 26, together with memory 61. Processor 60 and memory 61 interact in a conventional manner which is well known in the art of computer processing. Control panel 62 may be positioned at any convenient location, either above platform 12 or in access space 26. Control panel 62 may contain certain switching controls to be activated by an operator, and may also contain various light indicators to provide an indication of the operation of the system.

A number of servomechanism devices are located inside of robot manipulator 30, and the servomechanism devices typically include hydraulically actuable driving members for imparting rotational or linear movement about the respective axes defined with respect to robot manipulator 30. These servomechanisms also include shaft encoders or other equivalent devices for translating rotational and/or linear movement into digitally representative quantities for transmission to the processor 60. For example, servomechanisms 64, 66, 68 are preferably hydraulically actuable pistons and cylinders, for imparting linear motion to a servo crank arm connected about each of the axes 35, 39, 41. Included within servomechanisms 64, 66, 68 are encoders for responding to linear displacements, and for generating electrical signals representative of such linear displacements. Servomechanisms 70, 72, 74 are associated with the respective motions that may be imparted to flexible wrist 38, and which have been defined "roll", "pitch" and "yaw". Each of these servomechanisms also includes a digital translator for generating electrical signals representative of the respective motions. A spray control 75 may be a solenoid-actuated valve or other similar device, and is utilized to actuate the spray applicator 32. In particular instances, spray device 75 may also include mechanisms for controlling air supplied to spray applicator 32.

A servomechanism 76 forms a part of turntable 25, and serves to impart the rotational motion of turntable 25 about axis 24. Servomechanism 76 may be an electrical or hydraulically actuated motor or motors which is gear-coupled between turntable 25 and platform 12 for imparting the necessary rotational movement. A digital encoding device is included as a part of servomechanism 76 for generating electrical signals representative of the rotational position of turntable 25.

Digital processor 60 is connected in data transfer communication with all of the respective servomechanisms, according to well-known techniques, so as to generate driving signals to actuate the respective servomechanisms and control the movements associated with them. The digital encoding devices are similarly connected to the respective servomechanisms and processor 60, and processor 60 is programmed so as to periodically sample the signals generated by these encoding devices to provide a digital indication of position. Processor 60 is controlled by a program which is prestored in memory 61, and is adapted for execution by processor 60 so as to maintain coordinated control over the actuation of all servomechanisms, and to periodically receive positional information from the servomechanisms to monitor actual positions of the respective members.

Figure 6:
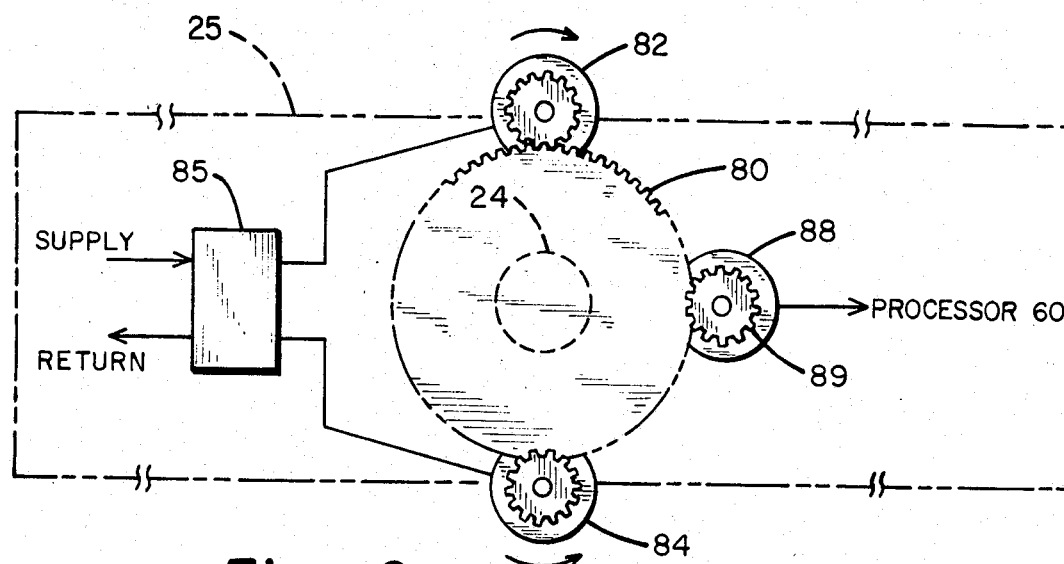
FIG. 6 shows a schematic diagram of the turntable drive mechanism.

FIG. 6 shows a schematic diagram of the servomechanism 76, which drives turntable 25 in response to signals from processor 60, and which transmits positional information to processor 60. A ring gear 80 is affixed to the upper bearing member of plate bearing assembly 48, and is therefore affixed to turntable 25. A pair of hydraulic motors 82 and 84 are affixed to platform 12, each of the motors 82 and 84 having a pinion gear engaged with ring gear 80. Motors 82 and 84 are driven in the rotational direction shown by the respective arrows, from a supply of pressurized hydraulic oil which is coupled to the motors via a servo valve 85. Servo valve 85 is a two-position valve, conveying the pressurized supply of oil to either motor 82 or to motor 84, and at the same time conveying a return supply of oil from the hydraulic motor not engaged by the pressurized oil. The return oil is directed back to an oil reservoir from which the pressurized oil supply is drawn. For example, when ring gear 80 is to be driven in the clockwise direction (as viewed in FIG. 6) the pressure oil supply is delivered via servo valve 85 to hydraulic motor 84, and hydraulic motor 82 is coupled to a return line. When ring gear 80 is to be driven in a counterclockwise direction the pressurized supply of oil is delivered to motor 82 via servo valve 85 and the return line is coupled to motor 84. When ring gear 80 is in a stationary position the pressurized supply of oil is delivered via servo valve 85 to both motors 82 and 84, thereby creating a balanced driving force against ring gear 80 and holding it in a fixed position. In this manner, the respective pinion gears of motors 82 and 84 are always engaged against the gear teeth of ring gear 80 in an opposite direction, thereby eliminating any rotational tolerance or backlash caused by gear teeth clearances.

Figure 7:
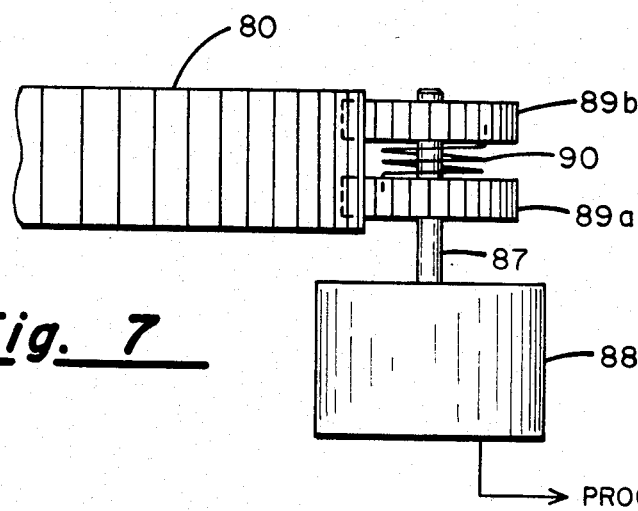
FIG. 7 shows a diagram of the resolver coupling.

A resolver 88 is engaged against ring gear 80 through a pinion gear 89. FIG. 7 shows an enlarged view of the gearing relationship between resolver 88 and ring gear 80. Pinion gear 89 is comprised of a first gear portion 89a, which is affixed to resolver shaft 87 and rotates therewith. Pinion gear 89 also includes a pinion gear section 89b, which is coupled to shaft 87 via a bearing, and is freely rotatable independent of shaft 87. Pinion gear sections 89a and 89b are connected together via a coil spring 90, and pinion gear sections 89a and 89b each have respective teeth for engagement against ring gear 80. Prior to engaging pinion gear sections 89a and 89b against the teeth of ring gear 80, the coil spring 90 is tightened by rotating gear section 89b relative to gear section 89a. After a predetermined spring force has been developed the respective gear sections are placed into engagement with ring gear 80, and coil spring 90 forces the respective pinion gear sections into oppositely directed engagement against respective teeth surfaces of ring gear 80. This eliminates any backlash or tolerance error in connection with shaft 87 of resolver 88, and thereby eliminates any positional inaccuracies which might otherwise result from resolver 88.

In operation, processor 60 is programmed so as to provide the desired positioning of spray applicator 32 with respect to parts mounted on turntable 25 for applying coating material thereto. Processor 60 incrementally rotates turntable 25 so as to place a parts mounting station in front of enclosure 14, and thereafter to manipulate spray applicator 32 and the controls which actuate spray applicator 32 to permit the selective release of coating materials upon the parts surfaces. After spray applicator 32 has been appropriately maneuvered to insure that coating materials are evenly distributed over all of the desired surfaces of the parts located on turntable 25, turntable 25 may then be incrementally rotated to position a new parts mounting station in front of enclosure 14. At the same time, a different parts mounting station on turntable 25 is positioned proximate access opening 22, and previously coated parts may be removed from the turntable and a new supply of parts may be attached to the turntable for subsequent coating. This process may be continued for so long as desired, and if parts having different surface configurations are attached to turntable 25 it is only necessary to implement a different software routine in digital processor 60 in order to provide the necessary positional control over spray applicator 32 and the turntable 25. The operator may communicate a particular parts configuration to digital processor 60 by means of control keys on control panel 62. It is therefore apparent that a wide variety and mix of parts configurations may be automatically positioned and coated by the apparatus described herein, where only inloading and unloading of the parts is necessarily accomplished under manual control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A self-contained work center for the automatic application of coatings to products, comprising:
   (a) a framework having an elevated platform;
   (b) a turntable rotatably affixed above said platform for rotation about a first vertical axis; said turntable having a plurality of stations thereon for affixing products thereto;
   (c) means for driving said turntable about said first vertical axis;
   (d) a robotic manipulator affixed above said turntable, and having means for rotating about said first vertical axis, said manipulator having attached thereto a coating applicator, and said manipulator having controllable freedom of motion for positioning said applicator at any point within a predetermined volume envelope, and means for driving said applicator; and
   (e) control means connected to said means for driving said turntable and to said means for driving said applicator, said control means having prestored means for coordinating the respective positions of said turntable and said applicator.

2. The apparatus of claim 1, wherein said control means further comprises a computer processor.

3. The apparatus of claim 2, wherein said means for driving said turntable further comprises a ring gear attached to said turntable and motor drive gear means engaged against said ring gear.

4. The apparatus of claim 3, wherein said motor drive gear means further comprises two motors and gears engaged against said ring gear in respective opposite driving directions.

5. The apparatus of claim 4, wherein said two motors further comprise hydraulic motors, and further comprising means for selectively directing pressurized hydraulic oil to both of said motors.

6. The apparatus of claim 3, further comprising a rotational transducer geared to said ring gear.

7. The apparatus of claim 6, wherein said rotational transducer further comprrses a resolver having a shaft affixed to a first gear, and having a second gear rotatable about said shaft and having a coil spring connected between said first and second gear.

8. A self-contained work center for the automatic application of coatings to products, comprising:
   (a) a framework having an elevated platform;
   (b) a turntable rotatably affixed above said platform for rotation about a first vertical axis;
   (c) means for controllably driving said turntable about said first vertical axis;
   (d) a robotic manipulator affixed above said turntable, said manipulator having attached thereto a coating applicator and said manipulator having controllable freedom of motion for positioning said applicator at any point within a predetermined volume envelope;
   (e) an enclosure attached to said framework and having an open side facing toward said robotic manipulator and positioned such that at least a portion of said volume envelope encroaches into said enclosure through said open side; and
   (f) a plurality of parts mounting stations on said turntable, mounted at positions such that rotation of said turntable causes said stations to rotate through at least a portion of said volume envelope.

9. The apparatus of claim 8, wherein said robotic manipulator further comprises means for rotating about a second vertical axis.

10. The apparatus of claim 9, wherein said second vertical axis is displaced from said first vertical axis.

11. The apparatus of claim 8, further comprising a plurality of openings through said elevated platform proximate said enclosure open side, and a lower air duct positioned beneath said openings.

12. The apparatus of claim 11, further comprising an air ventilation hood on said enclosure and a further air duct coupled between said hood and said lower air duct.

13. The apparatus of claim 8, further comprising means for circulating water through openings extending across the width of said enclosure and proximate the top of said enclosure opening, said means for circulating including a water collection tank positioned beneath said platform.

14. The apparatus of claim 8, further comprising a safety fence about the periphery of said platform.

15. The apparatus of claim 8, wherein said means for controllably driving said turntable further comprises means for controllably driving said robot manipulator.

16. The apparatus of claim 15, wherein said means for controllably driving further comprises a computer processor having electromechanical connections to said coating applicator for selectively actuating said applicator for dispensing coating materials.

* * * * *